J. H. EMKINS.
EGG TESTER OR CONTAINER.
APPLICATION FILED MAY 29, 1911.
1,153,298.
Patented Sept. 14, 1915.
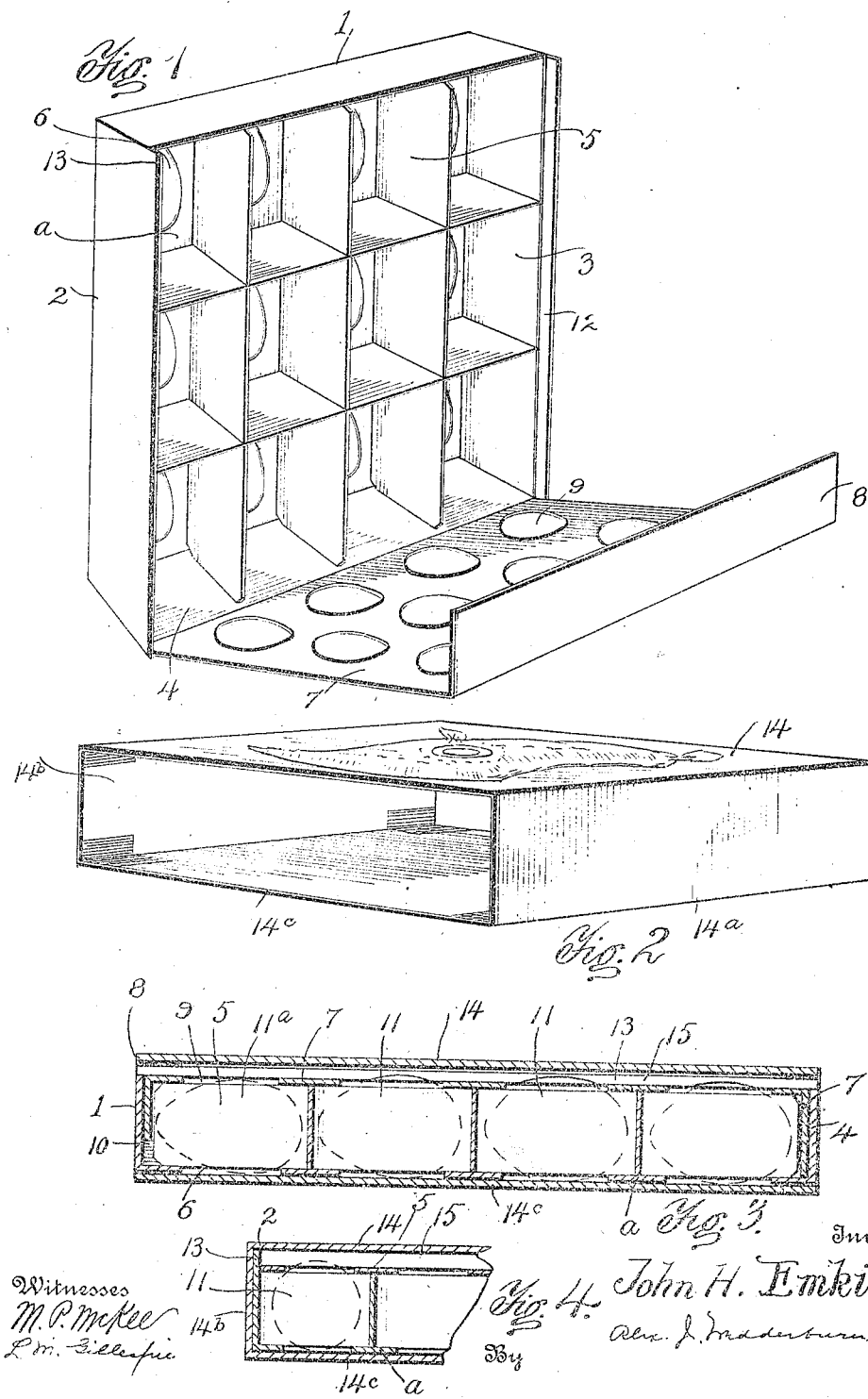

UNITED STATES PATENT OFFICE.

JOHN H. EMKINS, OF OMAHA, NEBRASKA.

EGG TESTER OR CONTAINER.

1,153,298.  Specification of Letters Patent.  Patented Sept. 14, 1915.

Application filed May 29, 1911. Serial No. 630,074.

*To all whom it may concern:*

Be it known that I, JOHN H. EMKINS, citizen of the United States, residing at Omaha, in the county of Douglas and State of Nebraska, have invented certain new and useful Improvements in Egg Testers or Containers, of which the following is a specification.

This invention relates to an egg tester and container and the object thereof is to provide a suitable egg receptacle which can be manufactured at such low cost as to render the expense negligible and thereby render the device fit to be distributed as an advertising novelty.

With the above and other objects in view I have invented the egg container shown in the drawings and described in the specification.

In the drawings Figure 1 is a perspective view of my egg container. Fig. 2 is a perspective view of the closure therefor. Fig. 3 is a side sectional elevation of the container, and Fig. 4 is a sectional detail view thereof at right-angles to Fig. 3.

Similar reference characters designate similar parts wherever used.

A pasteboard box 1 is provided with a movable partition 5 dividing the inside of the box into a plurality of egg compartments. One end of the box is formed with a cover 7 having a tab or bent portion 8 arranged to overlie the interior of the opposite end of the box and be frictionally held therein by the abutting end of the partition 5. The bottom *a* and the cover 7 of the box are formed with a plurality of ovoid alining apertures 6 and 9 respectively, one in each egg compartment, by means of which when the tab 8 of the folding cover 7 is fitted in the box between the abutting ends of the partition and adjacent side, the eggs may be exposed to advantage and readily tested. The sides 2 and 3 of the box 1 project over the other sides or ends thereof over which is slid a closure having but two sides, 14ª and 14ᵇ, top 14, and bottom 14ᶜ, which will thus be spaced apart from the cover 7 of the box 1. The object of this arrangement is to prevent the contained eggs in the box from having contact with said closure in order that they may be preserved against injury. The projecting portions of sides 2 and 3 are designated 13 and 12 respectively.

Reference being had to Figs. 3 and 4, the parts are shown in normal position, and at 11ª is designated an egg normally fitting its compartment, and at 11 a number of eggs of large size protruding through the apertures 9 of the cover 7 of the box 1, but having no contact with the contiguous faces of the closure.

My egg container and tester may be very easily turned out in large numbers from card-board, pasteboard and the like, and will efficiently facilitate the testing of the eggs contained in the box while it will accommodate eggs of various sizes without injury. It will be seen that the partition 5 is removable and that the various parts of the box are integrally formed.

I claim and desire to secure by Letters Patent:—

1. The described device consisting of a box having a lid with a right angular flange thereon, a bottom having openings therein, said lid having openings in alinement with said first openings, a cell member within said box, said box having its side walls projecting beyond its end walls, said projections being on a vertical plane with said side walls and a casing within which said box is slidable, said projections adapted to space said lid from the upper wall of said casing, said bottom and lid adapted to hold eggs within the cells formed by said cell member and said box.

2. The described device consisting of a box having a lid with a right angular flange thereon, a bottom having openings therein, said lid having openings in alinement with said first openings, a cell member within said box, said box having its side walls projecting beyond its end walls, said projections being on a vertical plane with said side walls and a casing within which said box is slidable, said projection adapted to space said lid from the upper wall of said casing, said bottom and lid adapted to hold eggs within the cells formed by said cell member and said box, said flange adapted to seat between the front end wall of said box and said cell member and adapted to be held frictionally seated between said projections.

In testimony whereof I affix my signature in presence of two witnesses.

JOHN H. EMKINS.

Witnesses:
EDWARD LEEDER,
FRED L. SMITH.